Patented Mar. 14, 1944

2,344,002

UNITED STATES PATENT OFFICE 2,344,002

SPINNING COMPOSITION AND TEXTILE FIBER MADE THEREFROM

Edward W. Rugeley and William M. Quattlebaum, Jr., Charleston, W. Va., assignors to Carbide and Carbon Chemicals Corporation, a corporation of New York No Drawing. Application August 18, 1939, Serial No. 290,797

6 Claims. (Cl. 260—23)

This invention relates to the art of stabilizing vinyl resins, and particularly to the stabilization of those vinyl resins which are to be used in the making of artificial fibers.

It is well known that the vinyl resins are sensitive to heat, and in the molding of articles from these resins, it is customary to incorporate in them small amounts of substances known as stabilizers for the purpose of retarding or inhibiting the decomposition of the resins which may occur when they are subjected to relatively high temperatures. This decomposition manifests itself as discoloration of the resin.

Of the various types of vinyl resins which have been made, the vinyl ester resins have been proven to have very desirable characteristics for the molding of articles, and in particular, those resins which may be formed by the conjoint polymerization of a vinyl halide with a vinyl ester of a lower aliphatic acid, and containing, preferably, from about 70% to about 95% by weight of the halide in the polymer, have physical properties which make them outstanding for the spinning of artificial fibers having unusual strength and resiliency. The conjointly polymerized resins of vinyl chloride and vinyl acetate are particularly suitable in this respect. In general, the resins should have average macromolecular weights of at least 7,500, and preferably in excess of about 15,000 and the upper value is limited only by the dispersibility of the resin in suitable liquids to produce spinnable solutions or dispersions. (Molecular weights referred to herein are calculated by Staudinger's formula from viscosity determinations of solutions of the resins.)

Since vinyl resins, as ordinarily prepared, consist of a mixture of polymeric aggregates of different molecular sizes, they need to be freed from polymers having excessively low molecular weights in order that the average macromolecular weight of the resin will be at least the minimum stated above. This may be accomplished by various extraction procedures, such as those described in Patent 1,990,685 to C. O. Young and S. D. Douglas, or by similar methods of partial dissolution and precipitation. The resin after such treatment must be completely dispersible in warm dry acetone, or in other liquids from which the filaments may be formed in the spinning operation. By "dry" acetone is meant this substance which contains less than about 0.60% by weight of water. It has been found that, when the acetone used contains water in excess of this amount, the quality of the resin dispersion is materially impaired, and solutions made from such solvents can be filtered and spun only with great difficulty where the higher macromolecular weight resins are used. The concentration of the vinyl resin used in the spinning solution is dependent upon and varies inversely with the macromolecular weight of the resin, but the resin content ordinarily employed using acetone as the solvent is 30% or less by weight. In forming the solution, the resin is best employed in the form of dry powder, and the dispersion, or the spinning "dope," may be made by combining the resin with the requisite quantity of dry acetone in a mixing device, such as one of the dough-type mixers or kneaders, provided with means of temperature control, and equipped to effect reflux of the solvent. The temperature of mixing and subsequent handling is conveniently maintained at about 50° C. The time required for mixing to obtain useful dispersions must be adjusted according to the ease of dispersion of the resin in the solvent, and this ordinarily consumes about 12 hours. The resulting "dope" is a clear, heavily gelatinous, non-flowing, plastic mass at room temperature, while at a temperature of 50° C. it assumes a very viscous, slowly flowable state. This viscosity has been determined by experiment to be desirable in the subsequent manipulation of the solution and its formation into filaments.

The spinning, or filament extrusion, operation may be carried out in equipment customarily employed for the so-called "dry-spinning" of other types of filaments. A bobbin-type thread take-up may be employed, or the filaments may be given a twist at the point of spinning by employing a "cap-type" mechanism.

The preferred vinyl resins for the manufacture of synthetic fibers and the method for producing the fibers therefrom are described in Patent No. 2,161,766, issued June 6, 1939 in the names of E. W. Rugeley, T. A. Feild, Jr., and J. F. Conlon.

Many compounds have been suggested as suitable stabilizers for these resins, and certain metal salts of higher aliphatic acids have proven more or less effective. Among these may be mentioned the stearates, oleates and palmitates of lead, cadmium and other metals. However, not all of these may be incorporated in the resin and still result in a perfectly transparent plastic. For example, lead stearate usually imparts a faint blue haze to the molded article which, of course, is objectionable if a transparent article is desired. In addition, in the production of stable vinyl resin fibers, it is necessary to use a stabilizing compound which will dissolve (as distinct from forming a dispersion of discrete particles) in the solvent employed in preparing the resin for spinning. Also, where perfectly clear fibers are desired, it is highly desirable that the stabilizer does not form a cloud or haze in the resin after removal of the spinning solvent.

This invention provides a group of compounds which exert a pronounced stabilizing effect upon the vinyl resins, particularly the products of the conjoint polymerization of vinyl halides with vinyl esters of lower aliphatic acids. These compounds are soluble in the usual solvents for these resins (at least in the concentrations to be employed) and the resins containing them remain quite clear after removal of the solvent. An additional feature of these stabilizers is that they also inhibit the slight, but nonetheless definite, corrosive action on metals, of spinning dispersions, or "dopes," made from these resins. In fact, the incorporation of these stabilizers in the spinning dope permits the use of standard iron and steel equipment without affecting the purity of the resin dope, and the resulting color of the yarn.

One of the obstacles to the use of the aforesaid metal salts of higher aliphatic acids as stabilizers for the vinyl resin fibers is that nearly all such compounds are insoluble in organic solvents, such as acetone. However, the introduction of a phenyl group into such higher aliphatic acids, as, for example, stearic, lauric, ethylhexoic and undecylic acid brings about a marked increase in the tendency of the acids to form metal salts soluble in organic solvents. A similar effect upon solubility is brought about by the branching of the carbon atom chain attached to the acid radical, although the most appreciable increase in this respect has been confined to the cadmium salts. Cadmium 2-ethylhexoate, the salt of such a branched-chain acid, was found to be soluble in all proportions in acetone. A double bond in the carbon chain also gave increased solubility of lead salts in acetone. For example, lead undecylenate was found to be soluble to the extent of about 4.5% in acetone, whereas lead laurate, which differs by only one methylene group and a double bond, is insoluble in acetone.

In particular the organic compounds of tin have been found to be especially well suited for the preparation of stable textile fibers made from the vinyl ester resins. The preferred compounds may, in general be defined as the products resulting from the reaction of carboxylic acids with alkyl, aryl, aralkyl or mixed alkyl-aryl tin oxides (or hydroxides), including the basic reaction products, although these tin oxides (or hydroxides) themselves are very suitable. For convenience, these reaction products may be designated as organic tin salts of carboxylic acids. These tin compounds are not only excellent stabilizers for the vinyl resins, permitting the production of perfectly clear articles, but they are sufficiently soluble in acetone (and certain other suitable solvents for the resin, especially other ketonic solvents) to permit incorporation of adequate quantities of them in spinning dopes, or dispersions. Also, where the fibers spun therefrom are to be made into fabrics which may be used next to the skin, the tin compounds are more desirable as stabilizers than the more commonly used lead compounds.

Among the tin compounds which are especially suitable stabilizers for textile fibers made from the vinyl resins there may be mentioned dibutyl tin oxide, tributyl tin hydroxide, triphenyl tin hydroxide, diphenyl tin oxide and their organic salts. Of the latter, the following compounds are representative.

Dibutyl tin diacetate
Dibutyl tin dilaurate
Dibutyl tin distearate
Dibutyl tin di(2-ethylhexoate)
Dibutyl tin di(undecylenate)
Dibutyl tin di(monoheptadecyl maleate)
Dibutyl tin phthalate
Dibutyl tin maleate
Dibutyl tin crotonate
Dibutyl tin basic acetate
Dibutyl tin basic stearate
Tributyl tin acetate
Tributyl tin laurate
Tributyl tin stearate
Tributyl tin maleate
Diphenyl tin dilaurate
Triphenyl tin laurate In the case of dibutyl tin oxide, it usually is necessary first to dissolve it in a high boiling solvent, such as dibutyl sebacate, in order to render it soluble in acetone.

Other metal-organic compounds which have the requisite properties to be suitable stabilizers for textile fibers made from the vinyl resins comprise the following specific compounds and their closely related homologues:

Calcium phenylethylhexoate
Cadmium phenylethylhexoate
Lead phenylethylhexoate
Calcium butylacetoacetate
Lead undecylenate Lead and calcium sterates, lead laurate and lead 2-ethylhexoate were found to be insoluble in acetone and most other ketones and other suitable solvents for the resins, and therefore are not useful in the stabilization of vinyl resin textile fibers made from dispersions of the resins in solvents. Although calcium butylacetoacetate stabilizes the vinyl resins very effectively (particularly the conjoint polymerization products described), and, in addition, readily dissolves in acetone, it forms an insoluble compound with acetone upon standing a short time which will not redissolve in hot acetone. For this reason, this compound has very definite limitations in the stabilization of vinyl resin fibers where it is incorporated with the solvent in the spinning dope, because the dope, or spinning solution, cannot be stored as a stable dispersion for a prolonged period prior to the spinning operation, as may be necessary in commercial operation in order to remove entrapped gases.

The preparations of some of the typical compounds found useful in this invention are given in the following examples.

EXAMPLE I (Calcium butylacetoacetate)

This compound was prepared by the reaction of butylacetoacetate with calcium acetate in the presence of ammonium hydroxide. It gave a clear solution in cold acetone, but precipitated upon standing overnight. This precipitate was then almost completely insoluble, even in hot acetone.

EXAMPLE II (Cadmium phenylethylhexoate)

Cadmium phenylethylhexoate was prepared by the reaction of cadmium oxide with the theoretical quantity of phenylethylhexoic acid at a temperature not exceeding 160° C. It was freed of traces of cadmium oxide by dissolving in acetone, filtering and evaporating the solution to dryness. The product, a waxy solid, was very soluble in acetone, hot methyl isobutyl ketone, ethanol and toluene. In tests at 135° C., it proved to be only slightly less effective as a stabilizer than the preceding compounds, giving a stability of one-half hour in one percent concentration.

EXAMPLE III (Calcium phenylthylhexoate)

Phenylethylhexoic acid was neutralized with sodium hydroxide solution and poured into a solution of the theoretical quantity of calcium acetate in water. The resulting salt was very soluble in acetone. Resin containing one percent of this stabilizer turned red in one-half hour at 135° C.

EXAMPLE IV (Lead undecylenate)

Lead undecylenate was prepared by neutralizing undecylenic acid with dilute sodium hydroxide solution and adding this to an aqueous solution of lead acetate. The salt precipitated as a white powder. This was filtered, washed with water and dried by fusion. It was soluble in hot acetone to the extent of about 4.5%. Although the compond is not appreciably soluble in cold acetone, an amount equal to 1% by weight of the resin in the spinning solution (which latter contains from 15% to about 30% by weight of the resin) remained dissolved at temperatures above 35° C. throughout the spinning operation. In stability tests on the yarn at 135° C., the unstabilized resin changed color in fifteen minutes, while the yarn containing 1% of lead undecylenate remained unchanged in color for ninety minutes. At 150° C., the stabilized yarn was lighter in color after twenty-five minutes than the unstabilized yarn was in five minutes.

EXAMPLE V (Lead phenylethylhexoate)

Phenylethylhexoic acid was prepared by chlorinating exthylhexoic acid at 110° C.–130° C. and reacting the resulting acid with benzene in the presence of aluminum chloride. Lead phenylethylhexoate was prepared by dissolving lead oxide in the theoretical quantity of phenylethylhexoic acid at a temperature not exceeding 160° C. It was freed of traces of lead oxide by dissolving in acetone, filtering, and evaporating the acetone solution to dryness. The product was a pale, amber-colored, viscous liquid, very soluble in acetone. Stability tests showed it to be an effective stabilizer of the conjointly polymerized vinyl ester resins described, although slightly less effective than lead undecylenate. For example, the resin remained stable (or undarkened) for one hour at 135° C., using a concentration of one percent of the stabilizer.

EXAMPLE VI (Tributyl tin hydroxide)

This compound was prepared by the reaction or butyl magnesium chloride in dibutyl ether with stannic chloride to give a mixture of tributyl tin chloride and tetrabutyl tin, which when heated with the theoretical quantity of stannic chloride at 200°–220° C. gave tributyl tin chloride. Upon hydrolysis with caustic, tributyl tin hydroxide was obtained. Triphenyl tin hydroxide may be prepared in an analogous manner from phenyl magnesium bromide.

EXAMPLE VII (Tributyl tin laurate)

This compound, a colorless liquid at room temperature, was prepared from tributyl tin hydroxide by fusion of the latter at 160° C. with the theoretical quantity of lauric acid.

EXAMPLE VIII (Dibutyl tin dilaurate and diacetate)

This compound was prepared by the reaction of a mixture of tributyl tin chloride and tetrabutyl tin with the theoretical quantity of stannic chloride to give dibutyl tin dichloride. This, when hydrolyzed with caustic, gave dibutyl tin oxide—a white solid insoluble in most organic solvents. It dissolved, however, in lauric acid to give dibutyl tin dilaurate, and in acetic acid to give dibutyl tin diacetate. Both of these stabilizers dissolved in vinyl resin solutions to yield exceptionally clear compositions, and provided better stability of the vinyl resin fibers than any of the other tin compounds.

Other metal-organic compounds than the particular ones disclosed are suitable for the stabilization of textile fibers made from the vinyl ester resins, provided the compounds are capable of neutralizing acid (especially hydrochloric acid if vinyl chloride forms a part of the polymeric macromolecules) and are sufficiently soluble in volatile ketones and other useful solvents, particularly acetone, to permit their incorporation in the spinning dispersion in suitable quantities.

Many variations will be apparent to those skilled in the art, and the invention should not be limited other than as defined by the appended claims.

We claim:

1. A stable spinnable composition which remains stable toward heat over a long period of time while maintained at an elevated temperature, which is non-corrosive to iron and steel, and which is capable of being spun in the form of fine heat-stable textile filaments, said composition being a clear plastic gelatinous nonflowing mass at room temperature, and being viscous, filterable and slowly flowable at a temperature of 50° C., and comprising a vinyl resin resulting from the conjoint polymerization of a vinyl halide with a vinyl ester of an aliphatic acid, which resin contains from about 70% to about 95% by weight of the halide in the polymer and has an average macromolecular weight of at least 7,500, dispersed in a volatile solvent for the resin capable of forming a spinning solution of said resin, said composition also containing dissolved therein a heat-stabilizing organic compound soluble in said volatile solvent and selected from the class thereof consisting of the dibutyl tin salts of acetic, 2-ethylhexoic, undecylenic, maleic, monoheptadecyl maleic, lauric, phthalic and crotonic acids; the tributyl tin salts of acetic, lauric, stearic and maleic acids; dibutyl tin basic acetate; dibutyl tin basic stearate; diphenyl tin dilaurate and triphenyl tin laurate; calcium, cadmium and lead salts of phenylethylhexoic acid; lead undecylenate; cadmium 2- ethylhexoate; dibutyl tin oxide; tributyl tin hydroxide; diphenyl tin oxide; and triphenyl tin hydroxide.

2. A stable spinnable composition which remains stable toward heat over a long period of time while maintained at an elevated temperature, which is non-corrosive to iron and steel, and which is capable of being spun in the form of fine heat-stable textile filaments, said composition being a clear plastic gelatinous non-flowing mass at room temperature, and being viscous, filterable and slowly flowable at a temperature of 50° C., and comprising a vinyl resin resulting from the conjoint polymerization of a vinyl halide with a vinyl ester of an aliphatic acid, which contains from about 70% to about 95% by weight of the halide in the polymer and which has an average macromolecular weight of at least 7,500, dispersed in acetone, said composition also containing dissolved therein a heat-stabilizing organic compound soluble in acetone and selected from the class thereof consisting of the dibutyl tin salts of acetic, 2-ethylhexoic, undecylenic, maleic, monoheptadecyl maleic, lauric, phthalic and crotonic acids; the tributyl tin salts of acetic, lauric, stearic and maleic acids; dibutyl tin basic acetate; dibutyl tin basic stearate; diphenyl tin dilaurate and triphenyl tin laurate; calcium, cadmium and lead salts of phenylethylhexoic acid; lead undecylenate; cadmium 2-ethylhexoate; dibutyl tin oxide; tributyl tin hydroxide; diphenyl tin oxide; and triphenyl tin hydroxide.

3. A stable spinnable composition which remains stable toward heat over a long period of time while maintained at an elevated temperature, which is non-corrosive to iron and steel, and which is capable of being spun in the form of fine heat-stable textile filaments, said composition being a clear plastic gelatinous non-flowing mass at room temperature, and being viscous, filterable and slowly flowable at a temperature of 50° C., and comprising a vinyl resin resulting from the conjoint polymerization of a vinyl halide with a vinyl ester of an aliphatic acid, which contains from about 70% to about 95% by weight of the halide in the polymer and which has an average macromolecular weight of at least 7,500, dispersed in acetone, said composition also containing dissolved therein a small amount of dibutyl tin dilaurate.

4. A heat-stable textile fiber composed of a vinyl resin resulting from the conjoint polymerization of a vinyl halide with a vinyl ester of an aliphatic acid, which resin contains from about 70% to about 95% by weight of the halide and which has an average macromolecular weight of at least 7,500, said resin containing a heat-stabilizing organic compound which is soluble in a solvent for the resin that is capable of forming a spinning solution of said resin, said organic compound being selected from the class thereof consisting of the dibutyl tin salts of acetic, 2-ethylhexoic, undecylenic, maleic, monoheptadecyl maleic, lauric, phthalic and crotonic acids; the tributyl tin salts of acetic, lauric, stearic and maleic acids; dibutyl tin basic acetate; dibutyl tin basic stearate; diphenyl tin dilaurate and triphenyl tin laurate; calcium, cadmium and lead salts of phenylethylhexoic acid; lead undecylenate; cadmium 2-ethylhexoate; dibutyl tin oxide; tributyl tin hydroxide; diphenyl tin oxide; and triphenyl tin hydroxide.

5. A heat-stable textile fiber composed of a vinyl resin resulting from the conjoint polymerization of a vinyl halide with a vinyl ester of an aliphatic acid, which contains from about 70% to about 95% by weight of the halide in the polymer and which has an average macromolecular weight of at least 15,000, said vinyl resin containing a stabilizer consisting of a butyl tin salt of lauric acid, said tin salt being at least partially soluble in a solvent for the resin.

6. A heat-stable textile fiber composed of a vinyl resin resulting from the conjoint polymerization of a vinyl halide with a vinyl ester of an aliphatic acid, which contains from about 70% to about 95% by weight of the halide in the polymer and which has an average macromolecular weight of at least 15,000, said vinyl resin containing dibutyl tin dilaurate.

EDWARD W. RUGELEY.
WILLIAM M. QUATTLEBAUM, Jr.